United States Patent

[11] 3,593,379

| [72] | Inventor | James W. Hendry<br>Helena, Ohio |
|---|---|---|
| [21] | Appl. No. | 814,898 |
| [22] | Filed | Apr. 10, 1969 |
| [45] | Patented | July 20, 1971 |
| [73] | Assignee | Borg-Warner Corporation<br>Chicago, Ill.<br>Continuation-in-part of application Ser. No. 766,926, Oct. 11, 1968. |

[54] PLASTICIZING AND WORKING MACHINE
17 Claims, 13 Drawing Figs.

[52] U.S. Cl. .................................................. 18/30 SR, 18/12 SA, 18/DIG. 22
[51] Int. Cl. ............................................................ B29f 1/00
[50] Field of Search .......................................... 18/2 EM, 12 B, 12 SA, 12 SS, 30 SR, 30 JM, 30 JS, 30 JT, DIG. 22

[56] References Cited
UNITED STATES PATENTS

| 1,657,132 | 1/1928 | Merle | 18/12 |
|---|---|---|---|
| 2,668,986 | 2/1954 | Miler | 18/30 |
| 2,813,302 | 11/1957 | Beck | 18/12 X |
| 3,023,455 | 3/1962 | Geier et al. | 18/30 X |
| 3,045,283 | 6/1962 | Keiser | 18/30 |
| 3,110,932 | 11/1963 | Fischer | 18/30 |
| 3,149,377 | 9/1964 | Morse | 18/30 |
| 3,278,986 | 10/1966 | Welt | 18/12 |

FOREIGN PATENTS

| 1,070,500 | 0/1954 | France | 18/30 (JS) |

Primary Examiner—H. A. Kilby, Jr.
Attorney—Woodhams, Blanchard and Flynn

ABSTRACT: A plasticizing machine including therein a rotatable plasticizing spinner. The plasticizing spinner includes a working portion which comprises an elongated cylindrical member having a plurality of axially spaced, annular ridges thereon. The working portion is surrounded by a substantially cylindrical housing to define a passage therebetween having a plurality of axially spaced gaps of small radial extent whereby plastic material passing through the gaps is folded and mixed.

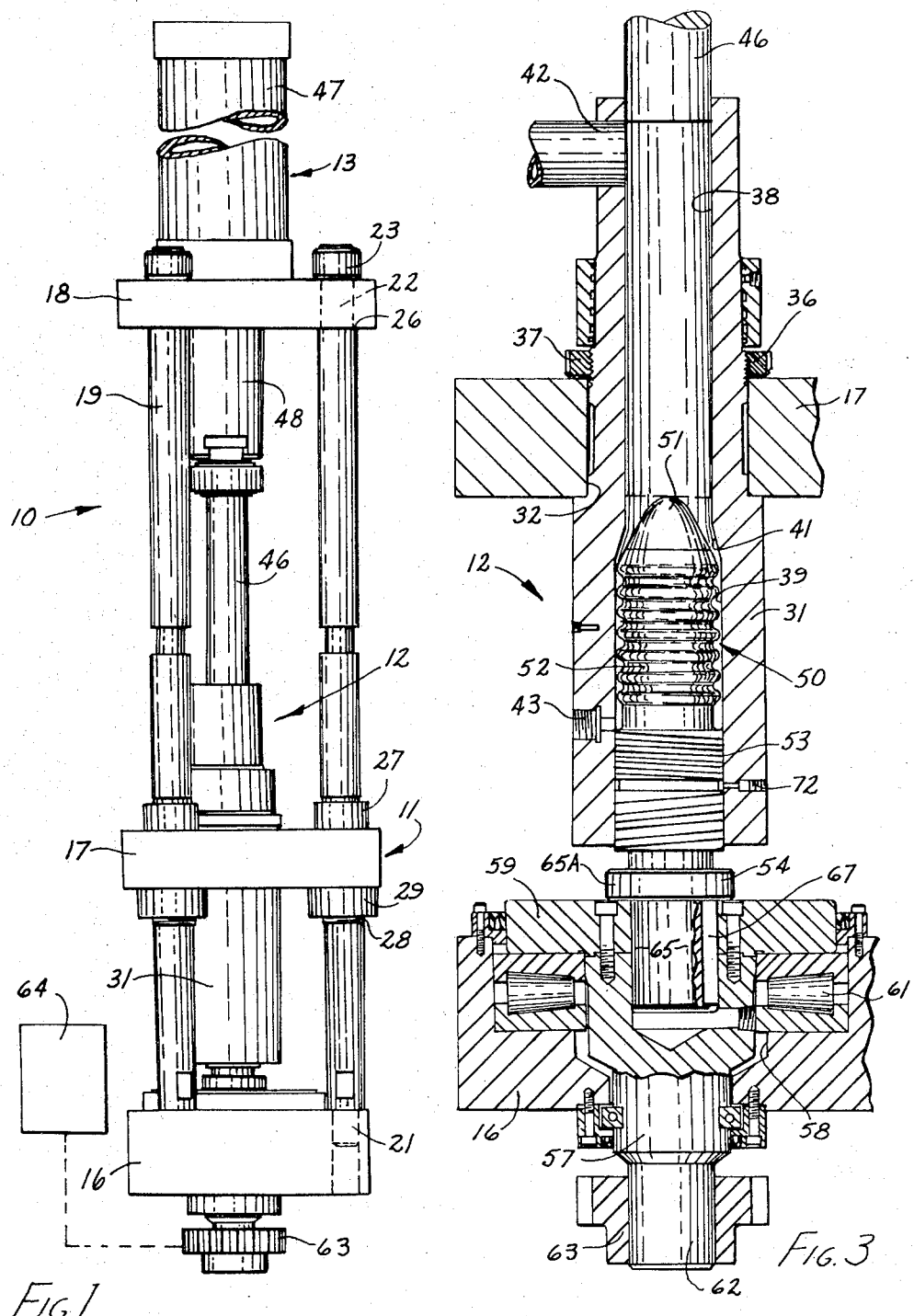

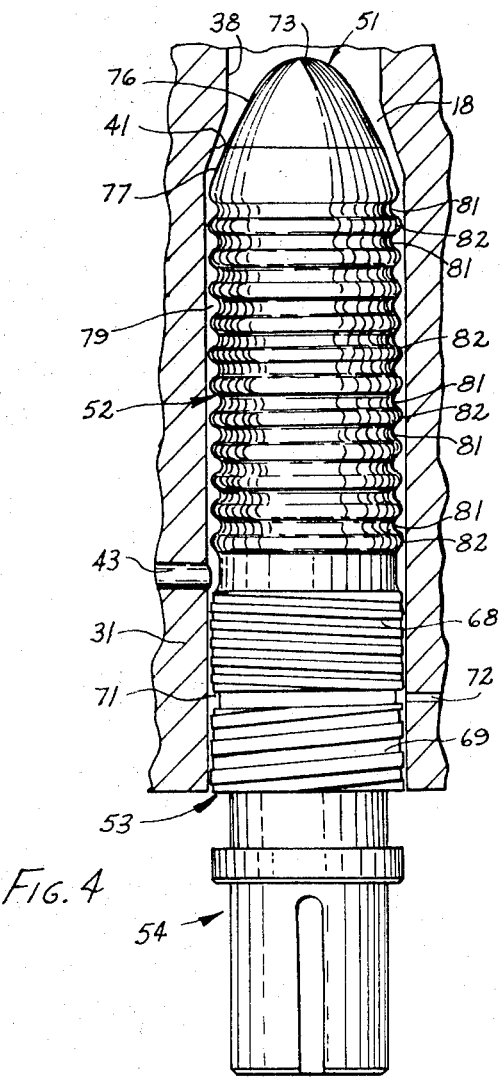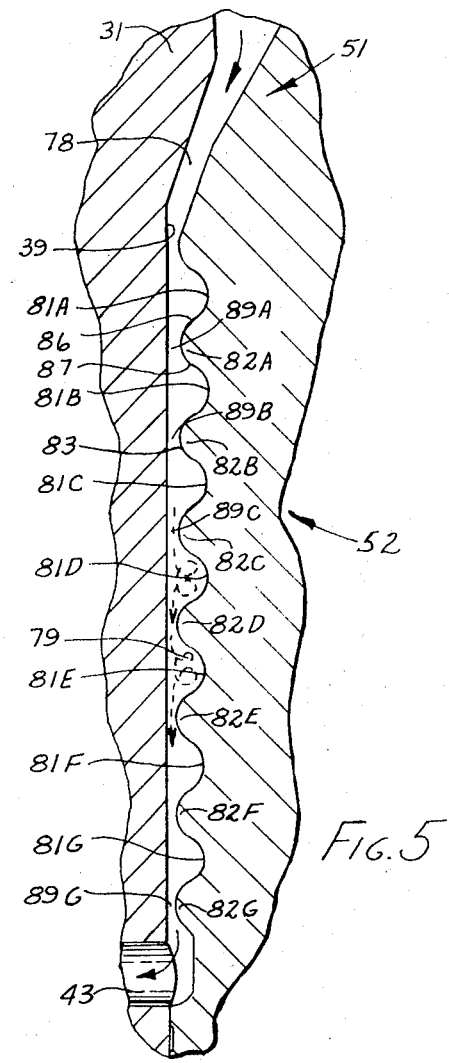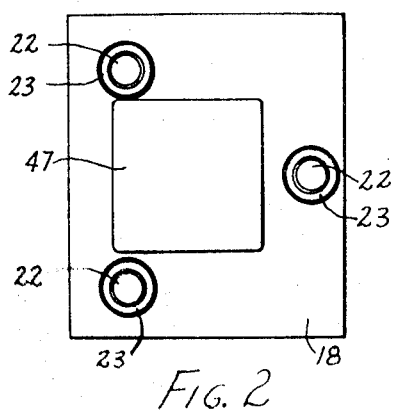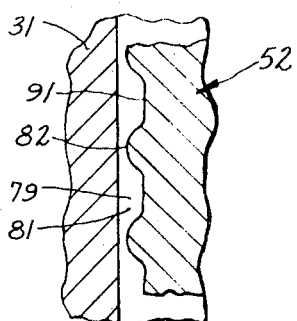

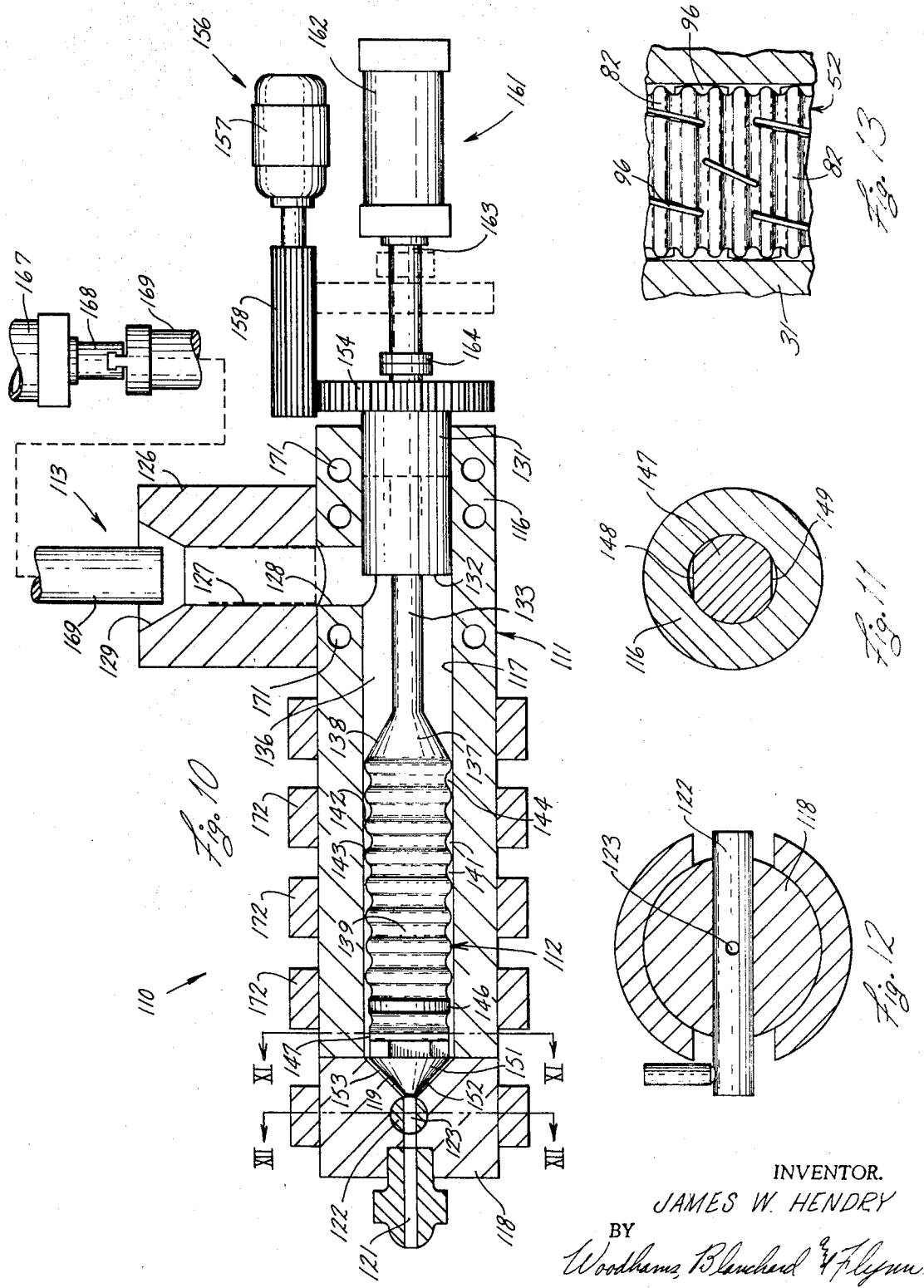

3,593,379

PLASTICIZING AND WORKING MACHINE

CROSS-REFERENCE TO RELATED APPLICATIONS

This application is a continuation-in-part of my copending application Ser. No. 766,926 filed Oct. 11, 1968, and entitled "Plasticizing and Working Machine."

FIELD OF THE INVENTION

This invention relates to a plasticizing machine utilizing a plasticizing rotor therein and more particularly relates to a plasticizing machine utilizing a plasticizing spinner having a plurality of axially spaced, annular ridges thereon.

BACKGROUND OF THE INVENTION

The present invention is a result of a continuing effort to improve the form and performance of plasticizing machines of the general type disclosed in my U.S. Pat. No. 3,358,334. This patent sets forth a plasticizing machine including a spindle, one end of which is tapered substantially from axis to periphery to form a cone rotatably disposed in a cylindrical opening in the machine housing. The end of the opening adjacent the conical end forms a conical seat which cooperates with the cone to frictionally work plastic material forced therebetween. Although the device of the aforementioned patent has so far proven highly desirable and advantageous, further research has shown the need for a machine having more flexibility and the ability to handle new materials which are becoming available. Also, there is a continuing need for a machine of improved performance characteristics, such as increased rate of production with utilization of less driving power.

Accordingly, the objects of this invention are:

1. To provide a plastic working machine having an improved plasticizing spinner.
2. To provide a machine, as aforesaid, wherein the spinner includes a cylindrical working portion having a plurality of axially spaced smooth annular ridges thereon.
3. To provide a machine, as aforesaid, wherein a housing closely surrounds the working portion and cooperates with the annular ridges to provide a plurality of spaced annular gaps, which gaps preferably decrease in magnitude in the direction of material flow.
4. To provide a machine, as aforesaid, wherein the ridges are separated by annular grooves with the ridges and grooves being connected by smooth curves to form a substantially smooth and continuous undulating surface on the spinner.
5. To provide a machine, as aforesaid, in which the ridges and grooves are sized and spaced so as to cause the material upon passing through a gap to roll or be folded over as it moves into the adjacent groove so as to become thoroughly intermixed.
6. To provide a machine, as aforesaid, wherein the spinner has a tapered portion fixedly secured to the inlet end of the working portion, the tapered portion having an external surface which diverges outwardly in the direction of material flow.
7. To provide a machine, as aforesaid, wherein means are provided for feeding particulate plastic material under positive pressure to the spinner for plasticizing same, said means imposing a pressure on the material which is independent of the rotation of the spinner.
8. To provide a machine, as aforesaid, wherein the material is completely plasticized and intermixed to result in a high degree of homogeneity.
9. To provide a machine, as aforesaid, which is relatively inexpensive to construct and maintain, which is efficient in operation, which is compact, and which is substantially self-cleaning in operation for allowing long continuous periods of running without stopping.

Other objects and purposes of this invention will be apparent to persons acquainted with apparatus of this general type upon reading the following specification and inspecting the accompanying drawings.

SUMMARY OF THE INVENTION

In general, the objects and purposes of this invention are met by providing a machine for frictionally working plastic material, the machine including a housing having an axially extending chamber and a spinner positioned within the chamber. Drive means are provided for rotatably driving one of the spinner and housing, preferably the spinner, with respect to the other and for supporting the spinner within the chamber against radial loads. The spinner is formed with a tapered portion connected to a substantially cylindrical working portion, which working portion is surrounded by a substantially cylindrical wall formed by the chamber of the housing. Either the working portion of the spinner or the housing, preferably the spinner, has a plurality of axially spaced annular raised portions formed thereon, which raised portions define a plurality of small annular gaps. Annular grooves are provided between the gaps for allowing material to be fed through the gaps so as to be frictionally worked whereby the material is completely plasticized and achieves a smooth and homogeneous consistency. Positive feed means are provided to feed plastic material for plasticizing under a positive pressure to the plasticizing spinner, the feed means imposing on the material a pressure which is independent of the rotation of the spinner.

BRIEF DESCRIPTION OF THE DRAWINGS

FIG. 1 is a side elevational view of the machine embodying one embodiment of the spinner of the present invention.

FIG. 2 is a top view of the machine illustrated in FIG. 1.

FIG. 3 is a broken, partial cross-sectional view of the machine illustrated in FIG. 1.

FIG. 4 is an enlarged view of the spinner illustrated in FIG. 3.

FIG. 5 is an enlarged fragmentary view of the working portion of the spinner of FIG. 4 illustrating the manner in which the material flows therethrough.

FIG. 6 is an enlarged view similar to FIG. 4 and illustrating a modified configuration of the working portion of the spinner.

FIG. 10 is an elevational cross-sectional view of a further machine embodying another embodiment of the spinner according to the present invention.

FIG. 11 is a cross-sectional view taken along the line XI-XI o6 FIG. 10.

FIG. 12 is a cross-sectional view taken along the line XII-XII of FIG. 10.

FIG. 13 shows a further modification of the rotor wherein vanes are supplied to modify and/or direct the flow of plastic material along the rotor.

Figure 7:
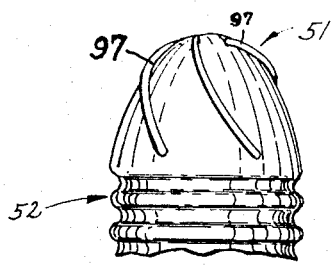
FIGS. 7—9 are fragmentary views illustrating further spinner modifications.

Certain terminology will be used in the following description for convenience in reference only and will not be limiting. The words "upwardly," "downwardly" "rightwardly" and "leftwardly" will designate directions in the drawings to which reference is made. The word "forwardly" will refer to the normal direction of material flow through the device, such direction being downwardly in FIGS. 3 and 4 and leftwardly in FIG. 10. The words "inwardly" and "outwardly" will refer to directions toward and away from the geometric center of the device and designated parts thereof. Such terminology will include the words above specifically mentioned, derivatives thereof and words of similar import.

DETAILED DESCRIPTION

FIGS. 1—3 illustrate a plastic working machine 10 embodying therein one form of the invention. The machine 10 includes a housing 11 which supports therein the plasticizing and working device 12, which device is supplied with particulate plastic material by a feed means 13.

While the DETAILED 11 may comprise any convenient means, same is illustrated in FIGS. 1 and 2 as including a baseplate 16 and a pair of laterally spaced support plates 17 and 18 interconnected by a plurality of rod members 19. One end of each of the rod members 19 is provided with a threaded portion 21 thereon threadedly engaged within threaded openings formed in the base-plate 16. The rod members are provided with reduced portions 22 on the other end thereof which extend through openings formed in the support plate 18 with the support plate being fixedly secured to the rod members by being held between the nut 23 and the shoulder 26. The support plate 17 is fixedly positioned intermediate the base 16 and the support plate 18 by being fixedly secured between shoulder portions 27 formed on the rods and nuts 29 which are threadedly engaged on intermediate threaded portions 28 also formed on the rods.

The housing 11 further includes a barrel 31 which has a reduced portion which is positioned in and extends through an opening 32 formed in the support plate 17, the barrel being axially positioned by means of a shoulder 33 formed thereon in abutting engagement with one side of the support plate 17. The barrel 31 has a threaded portion 36 which receives a nut 37 thereon, which nut is rotated into tight abutting engagement with the other side of the support plate 17 for fixedly securing the barrel 31 relative to the support plate 17. The barrel 31 has a pair of coaxial cylindrical openings 38 and 39 formed therein, which openings are in this embodiment of slightly different diameter and are interconnected by means of a tapered seat 41, thereby forming an elongated chamber which extends throughout the length of the barrel. A feed opening 42 extends through the sidewall of the barrel 31 adjacent one end thereof in communication with the cylindrical opening 38, while a discharge opening 43 extends through the sidewall of the feed barrel adjacent the other end thereof in communication with the cylindrical opening 39. The purpose of these openings will be explained hereinafter.

Mounted directly adjacent one end of the barrel 31 is the feed means 13 which includes a reciprocating power means 47, preferably in the form of a fluid pressure cylinder which in this case is hydraulically actuated. The fluid pressure cylinder 47 is fixedly secured to the support plate 18 and has a piston rod 48 which slideably extends therefrom through an opening formed in the support plate 18, the lower end of the piston rod being connected to a ram 46 which extends into and is slideably received within the cylindrical opening 38. The ram 46 is movable between a retracted position illustrated in solid lines in FIG. 3, wherein the feed opening 42 is uncovered, and an extended position illustrated in dotted lines in FIG. 3, wherein the ram 46 closes the feed opening 42 and is positioned closely adjacent the plasticizing and working device 12.

As illustrated in FIG. 3, the plasticizing and working device 12 generally comprises a rotor or spinner 50 which is supported in and is rotatable relative to the housing 11. The spinner 50 preferably includes thereon four basic portions which, for convenience, will be referred to as the tapered portion 51, the working portion 52, the seal portion 53 and the support portion 54.

Considering first the manner in which the spinner 50 is in this embodiment rotatably supported in the housing, there is provided a drive hub 57 which is positioned in and extends through a recess 58 formed in the base plate 16. The drive hub 57 is rotatably supported relative to the baseplate 16 by means of a combination thrust and radial roller bearing 61. One end of the drive hub 57 has a thrust plate 59 fixedly secured thereto in bearing engagement with the roller bearing 61, while the other end of the hub is provided with a stub shaft 62 to which is suitably secured any type of drive means, such as a gear member 63. Gear member 63 is in turn rotatably driven by any convenient means, such as a motor or drive unit 64.

The support portion 54 of the spinner 50 is connected to the drive hub 57 by means of a shaft extension 65 which extends into a recess 66 formed within the drive hub 57, the shaft extension 65 being nonrotatably secured to the drive hub 57 by means of a key 67. The shaft extension 65 is further provided with an integral thrust flange 65A formed thereon, which flange axially bears against the thrust plate 59 so as to transmit axial thrust loads from the spinner 50 through the thrust plate 59 and the bearing 61 to the housing 11.

The support portion 54 of the spinner (see FIG. 4) is fixedly, here, integrally, connected to the seal portion 53 and includes a pair of helical threads 68 and 69 of shallow rectangular cross section formed therein. The threads 68 and 69 are of opposite hand and are spaced from one another by a small annular groove 71. The hand of the thread 68 and the direction of rotation of the spinner 50 are so related that the thread 68 will tend to urge downwardly (in FIG. 4) a small amount of plastic material to assist in lubricating the spinner and to seal the end of the barrel 31. In the particular embodiment shown, the thread 68 is a left-hand thread and the preferred rotational direction of the spinner is clockwise as seen from the bottom end thereof in FIG. 4 whereupon the thread 68 thus tends to urge a small quantity of plastic material through the thread toward the shallow groove 71. A waste outlet 72 formed in the barrel 31 extends outwardly from the groove 71 to allow for escape of whatever plastic material is moved downwardly as above mentioned. Since the hand of the thread 69 is opposite that of the thread 68, the thread 69 will tend to maintain the material within the groove 71 and will prevent the material from escaping from the bottom end of the barrel 31.

Considering now the tapered portion 51 of the spinner 50, same is positioned within the barrel 31 in close proximity to the tapered seat 41 formed therein. The tapered portion is provided with a rounded nose 73 which partially extends into and faces the cylindrical opening 38 containing the ram 46 therein, said nose being shown as smooth in FIGS. 3 and 4 but which may be ribbed if desired as shown in FIG. 7. The ribs 97 of course may be of any shape, such as being angled as shown to assist in drawing material into the plasticizing zone or they may be arranged parallel to the axis of the rotor in which case there will be no propelling effect but merely agitating. Further, as illustrated in FIG. 4, the tapered portion is formed with first and second tapered surfaces 76 and 77 thereon, which surfaces as illustrated are conical and are of slightly different slopes. For example, the first conical surface 76 forms an included angle of approximately 30° with respect to the rotational axis of the spinner, while the second conical surface 77 forms an included angle of approximately 20° with respect to the rotational axis of the spinner. The first and second surface 76 and 77 are positioned closely adjacent to and slightly spaced from the surrounding tapered seat 41, which is also conical in the illustrated embodiment, so as to define a narrow annular passage or zone 78 therebetween, which zone 78 constitutes an initial heating zone.

While the spinner of the present invention has been disclosed as utilizing two conical surfaces of different slopes thereon, it will be obvious that the tapered portion of the spinner could have a nonconical surface or only a single conical surface formed thereon in substantially the same manner as disclosed in my prior U.S. Pat. No. 3,358,334. Also, the seat 41, if utilized, is preferably formed with a slope or configuration thereon which is, at least within a matter of a few degrees, substantially equal to the slope or configuration formed on the spinner. However, it is preferable to use slightly different slopes or configurations between the spinner and the seat so that the annular zone 78 will decrease in radial thickness in the normal direction of material flow, whereby the cross-sectional area of the heating zone 78 throughout the axial length thereof remains substantially constant or decreases slightly in the normal flow direction. Further, if desired, the seat 41 in close surrounding relationship to the tapered portion 51 can be eliminated as disclosed and illustrated in copending application Ser. No 712,175, filed Mar. 11, 1968, now Pat. No. 3,563,514.

Figure 8:
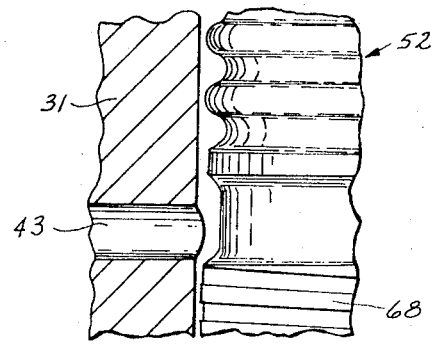

The base of the tapered portion 51 is fixedly, here integrally, connected to the working portion 52, which portion is substantially cylindrical and has a plurality of axially spaced, annular grooves 81 formed on the periphery thereof. Each pair of adjacent grooves 81 forms an annular ridge 82 therebetween. The detailed configuration of the working portion 52 and its relationship to the surrounding housing 11 is more clearly illustrated in FIG. 5 which is a partial cross-sectional enlargement of the ridges, referred to as 82A, 82B, 82C, etc., and of the grooves therebetween, referred to as 81A, 81B, 81C, etc. Each ridge 82 in the rotor of FIGS. 1—6 has a crest 83 formed with a smooth and rounded configuration but if preferred, one or more of the crests near the downstream end of the working portion 52 may, such as the crest 92 shown in FIG. 8, be flat and of at least measurable axial extent. Further, ramps 86 and 87 of a smooth and arcuate configuration connect adjacent grooves 81 to the intermediate ridge 82 so that the working portion 52 will have a smooth but undulating surface configuration. In the embodiment illustrated in FIG. 3, the grooves 81 are formed with rounded bottom surfaces.

As shown in FIG. 5, the cylindrical opening 39 formed in the feed barrel 31 is of substantially constant diameter throughout the axial length thereof and defines an annular working and plasticizing passage 79 which surrounds the periphery of the working portion 52. However, the diameter of the annular ridges 82 progressively increases in the normal direction of flow. That is, the first annular ridge 82A adjacent the base of the tapered portion is of a slightly smaller diameter than the next adjacent annular ridge 82B. Similarly, the annular ridge 82B is of slightly smaller diameter than the next adjacent annular ridge 82C. All of the annular ridges thus progressively increase slightly in diameter such that the last annular ridge 82G is of a larger diameter than any of the other annular ridges formed on the spinner. Due to the progressively increasing diameter of the ridges, the radial clearance gap 89A formed between the barrel 31 and the annular ridge 82A is of a slightly larger radial thickness than is the radial gap 89B, which in turn is of a slightly larger radial thickness than the gap 89C, the remainder of the gaps being of progressively decreasing radial thickness in the normal direction of flow whereupon the gap 89G is of a smaller radial thickness than any of the other gaps formed between the working portion 52 and the cylindrical opening 39. While the annular ridges are of progressively increasing diameter, the depth of the grooves 81 preferably remains substantially constant throughout the axial length of the spinner and thus the root diameter of the spinner progressively increases throughout the axial length from the tapered portion 51 to the seal portion 53.

While it is preferable to form the annular ridges 82 with progressively increasing diameters so as to result in progressively decreasing radial gap widths, it will of course be obvious that the spinner of the present invention could be formed with a plurality of substantially equal diameter annular ridges thereon whereupon the gaps would all be of substantially the same width. While such a configuration would result in an efficient plasticizing operation, the use of a plurality of gaps of decreasing radial widths is preferred since causing the material to pass through progressively smaller gaps insures that the very small particles are completely plasticized and mixed within the plastic mass. This results in a moldable plastic mass having a high degree of consistency and homogeneity.

Figure 9:
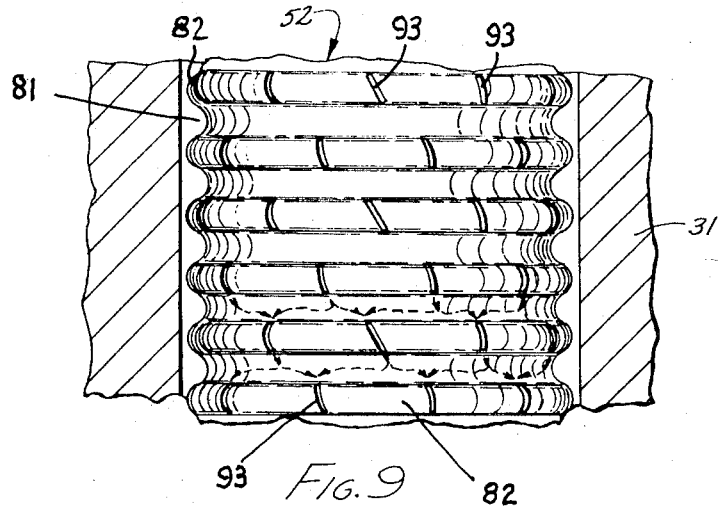

If desired, to improve the flow of plastic material through the working portion 52, slots 93 as shown in FIG. 9 may be cut through the ridges 81. Said slots may be oriented to assist axial flow of plastic material, to oppose same, or they may be parallel to the axis of the rotor. In any event, if used, they will normally be staggered as shown in FIG. 9 with respect to each other to assure some circumferential flow between adjacent ridges, as shown by the broken lines in FIG. 9, and to prevent channeling.

Further assistance and/or control of the flow of the plastic material along the rotor 52 may be obtained by providing vanes 96 on and/or between the annular ridges 82 as indicated in FIG. 13. These vanes 96 may be oriented as desired to assist the flow of material in the desired direction, to oppose such flow or same may be arranged parallel to the axis of the rotor whereby they will merely agitate the material, and tend to scrape same off the walls of the surrounding housing 31 but will neither assist nor oppose the flow thereof.

OPERATION

The operation of the device embodying the invention will be described in detail hereinbelow for a better understanding of the invention.

Assuming the ram 46 to be in its retracted position and assuming that particulate plastic material (cold or only slightly preheated for too much preheating will cause same to stick to the ram) is supplied through the feed opening 42 into the cylindrical opening 38, the power cylinder 47 will then be energized so as to move the ram 46 forwardly through the opening 38 so as to force the particulate plastic material into contact with the nose portion 73 of the spinner 50. The drive motor 64 may be energized either when, or before the ram 46 is moved, the drive motor 64 rotating the spinner 50 at a preselected speed which may be constant or variable as desired. As the ram 46 moves the particulate plastic material forwardly along the opening 38, some of the material is pressed against the nose 73 of the spinner and is moved into the annular zone 78 surrounding the tapered portion 51. As the material is moved into the annular zone 78, the relative rotation of the housing and spinner initiates frictional working of the material.

As further material is forced by the ram 46 into the annular zone 78, frictional working of the particles of material is greatly increased and the particles are heated as the material flows radially outwardly through the annular passage 78. The material upon leaving the annular zone 78 flows into the annular passageway 79 which surrounds the working portion 52 of the spinner with the material then flowing axially through this annular passageway until it reaches the discharge opening 43, whereupon the material is discharged to an external utilizing device, such as an injection molding or an extrusion device.

The ram 46 may be operated in such a manner that a single ram stroke is used for each filling of the mold or it may be operated at a higher rate of reciprocation as desired according to the requirements of the given instance.

As the material passes through the annular passage 78, the particles are frictionally heated and thus, upon leaving the passage 78, the material may be substantially in the form of softened particles. Alternatively, the material leaving passage 78 may be partially or substantially completely plasticized. The exact condition of the material leaving the zone 78 is primarily dependent upon the amount of frictional heat generated within the zone 78, which in turn is dependent upon several different variables, such as the relative rotational speed between the spinner and the housing, the positive pressure applied to the material within the zone 78, and the exact configuration of the zone 78, particularly the radial width thereof.

The material leaving the annular passage 78 adjacent the first annular ridge 82A thus generally contains at least occasional plastic particles which are only softened or partially plasticized. Further, the material leaving the annular passage 78 may not be of a very homogeneous nature since the material sometimes undergoes less than sufficient mixing as it travels radially outwardly through the annular passage 78. Thus, the material upon entering the working passage 79 is not necessarily completely plasticized nor of a desired homogeneity.

As the material passes into the annular working and plasticizing zone 79, it is successively forced through the series of axially spaced gaps 89 whereupon the relative rotation between the spinner and the housing causes further additional working and plastification of any remaining unplasticized particles contained in the mass of material. Further, where the gaps are of progressively decreasing width, additional assurance is obtained that even the smallest particles are completely plasticized by the time the material reaches the discharge opening 43. Also, the narrow gaps necessarily cause the material to be redistributed and accordingly results in more intermixing of the material so as to result in a more homogeneous consistency.

The homogeneity of the material is further increased by providing that the grooves 81 between the ridges 82 are somewhat larger than necessary for merely defining the ridges. As schematically illustrated by the dotted arrows in FIG. 5, as the material passes through a gap into the adjacent groove, the material tends to roll in the direction of movement whereupon some of the material is folded back adjacent other portions of the material positioned slightly therebehind whereby the material thus becomes folded and intermixed such that the material, upon reaching the discharge opening 43, is of a highly homogeneous nature. Further, assuming that the ridges 82 are not provided with sharp crests thereon or that the grooves 81 are not too deep in relationship to the height of the ridges 82, the rolling movement of the material as it passes through the grooves 81 tends to maintain the grooves clean and thus prevents the accumulation of material within the grooves, which accumulation would result in deterioration or charring of the material and thus destroy the usability of the material for most commercial applications. By making the bottom surface of the grooves 81 rounded as illustrated in FIG. 5, the material tends to roll throughout the length of the groove until reaching the next adjacent ridge. However, if desired, the grooves 81 can be provided with flat bottoms 91 substantially as illustrated in FIG. 6. The use of a flat bottom is particularly desirable if the annular ridges 82 are axially spaced a substantial distance apart since use of a rounded bottom in this situation would require an excessive depth between the bottom of the groove and the crest of the ridge, which depth would permit material to collect therein and thus contaminate the apparatus.

The spinner as described above has been disclosed as possessing a smooth and undulating surface formed by a plurality of axially spaced ribs and grooves. However, it will be obvious that other undulating or irregular surface profiles could be utilized on the spinner, the only requirement being that the material flow along the periphery of the spinner so as to maintain continuous contact therewith and thereby not leave any voids or spaces which would tend to become pockets of contamination.

As an example of a typical spinner utilizing annular ridges thereon, the spinner illustrated in FIG. 3 can be provided with eight grooves having a depth of 0.25 inch with the first annular ridge having a maximum diameter of 5.325 inches, the diameter of the intermediate ridges progressively changing in a linear manner. Further, the crest 83 formed on the ridges and the ramps 86 and 87 interconnecting the ridges to adjacent grooves are all formed with a radius of approximately one-fourth inch, and the adjacent ridges are axially spaced from one another by a distance of approximately 1.2 inches.

While the spinner described above utilizes a plurality of axially spaced ridges of progressively increasing diameter so as to result in a series of gaps of decreasing width, it will be obvious that at least similar results could be achieved by forming all of the annular ridges 82 of substantially the same diameter, with the cylindrical opening 39 in the housing being tapered in a converging manner in the direction of material flow so as to result in a series of progressively decreasing gaps. Alternatively, the annular ridges could be formed on the internal periphery of the housing with the portion of the spinner confronting the ridges having a substantially smooth cylindrical periphery.

MODIFICATIONS

FIGS. 10—12 illustrate therein a plasticizing machine 110 which is a modification of the machine illustrated in FIGS. 1—4. Specifically, the machine 110 includes a housing 111 which supports therein a modified plasticizing and working device 112, which device is supplied with particulate plastic material by a feed means 113.

The housing 111 specifically comprises a main barrel portion 116 which has a cylindrical opening or chamber 117 extending therethrough. The forward end of the barrel portion 116 is fixedly connected, by any suitable means, to a head portion 118. Head portion 118 includes a tapered recess 119 therein which aligns with and forms a continuation of the chamber 117 when the barrel and head portions 116 and 118 are secured together.

The head portion 118 is further provided with a flow passage 121 therethrough, one end of which communicate with the tapered recess 119 substantially adjacent the apex thereof while the other end of flow passage 121 communicates with a suitable plastic consuming device, such as an injection mold or an extrusion die. The head portion 118 further includes a valve member 122 rotatably supported therein, which valve member includes a control passage 123 therethrough. The control passage 123 forms a portion of the flow passage 121 when the valve 122 is rotated to the open position as illustrated in FIG. 10. However, rotation of the valve member 122, either manually or automatically, permits interruption in the flow through the passage 121. The valve member 122 is conventional and thus further description thereof is not believed necessary.

The housing 111 further includes an inlet portion 126 fixedly secured to the barrel portion 116 adjacent the other end thereof. The inlet portion 126 includes a cylindrical feed opening 127 therethrough, which opening is aligned with a further cylindrical inlet opening 128 which extends transversely through the sidewall of the barrel portion 116 to communicate with the central chamber 117. The upper end of the cylindrical opening 127 is, in this embodiment, formed with an enlarged tapered inlet 129 to facilitate the feeding of particulate plastic material into the opening 127, the material being fed to the inlet 129 by any suitable means, such as a conventional hopper or conveyor device.

Mounted directly adjacent the upper end of the inlet housing portion 126 is a reciprocating power means 167, preferably in the form of a fluid pressure cylinder which in this case is hydraulically actuated. The fluid pressure cylinder 167 is stationarily positioned and has a piston rod 168 which slideably extends therefrom, the lower end of the piston rod being connected to a ram 169 which extends into and is slideably received within the cylindrical opening 127. The ram 169 is movable between the retracted position illustrated in solid lines in FIG. 10, wherein the feed opening 127 is uncovered, and the extended position illustrated in dotted lines in FIG. 10, wherein the forward end of the ram 169 is positioned closely adjacent the plasticizing and working device 112.

As illustrated in FIG. 10, the plasticizing and working device 112 comprises a rotor or spinner which is supported in and is rotatable relative to the housing 111. The spinner 112 includes thereon three basic portions which, for convenience, will be referred to as the ram portion 131, the working portion 139 and the nose portion 151.

The ram portion 131 is of an elongated cylindrical configuration and is snugly but rotatably and axially slideably received within the end of the chamber 117. The ram portion is provided with a substantially transverse face 132 on the forward end thereof. An intermediate shaft portion 133 is fixedly secured, here integrally, to the ram portion 131 and extends outwardly from the working face 132, the intermediate portion 133 being of substantially smaller diameter than the chamber 117 to define an annular flow passage 136 therebetween.

The other end of the intermediate shaft portion 133 is fixedly, here integrally, secured to a tapered portion 137 having a tapered surface 138 formed thereon, the tapered surface 138 diverging outwardly in the direction of material flow and preferably being of a conical configuration. The tapered portion 137 can be formed in substantially the same manner as explained relative to the embodiment illustrated in FIGS. 1—4 or same can be formed with a single conical surface thereon substantially as disclosed in my prior U.S. Pat. No. 3,358,334.

The base of the tapered portion 137 is fixedly, here integrally, connected to the working portion 139, which portion is substantially cylindrical and has a plurality of axially spaced, annular grooves 141 formed on the periphery thereof. Each pair of adjacent grooves 141 forms an annular ridge 142 therebetween, which ridges cooperate with the surrounding internal peripheral wall of the chamber 117 to define small annular gaps 143 therebetween. The geometrical details of the working portion, particularly the configuration of the grooves, ridges and gaps, is explained above in detail relative to FIGS. 1—9. The ridges 142 are preferably formed with a smooth and rounded configuration but, if preferred, one or more of the ridges near the downstream end of the working portion 139 may be formed with a flat crest having at least a measurable axial extent, such as the ridge 146 illustrated in FIG. 10.

The downstream end of the working portion 139 is fixedly, here integrally, connected to a cylindrical support portion 147 (FIGS. 10 and 11) which is snugly but rotatably and axially slideably received within the cylindrical chamber 117. The cylindrical support portion 147 is provided with a plurality of flats 148 formed thereon, thereby forming passages 149 for permitting material to flow therepast.

The spinner 112 further includes a nose portion 151 which is fixedly, here threadedly, connected to the cylindrical support portion 147. The nose portion 151 is adapted to extend into the recess 119 formed within the head portion 118, the nose portion 151 being formed with a tapered surface 152 thereon which is of a configuration similar to the configuration of the recess 119 for a purpose to be explained hereinafter. The tapered surface 152 cooperates with the surrounding internal wall defining the conical recess 119 to define a material storage chamber 153 therebetween. Any conventional type of antiflow-back means (not shown), such as the well-known sliding ring, may be provided at the rotor tip 151 to permit flow of plastic into the chamber 153 but prevent its flowing back over the rotor when same is actuated to eject material from the chamber 153. Such antiflow-back devices are well known and hence need no further detailing here.

To effect rotation of the spinner 112 within the cylindrical chamber 117, there is provided a first drive means 156 which includes a conventional motor 157 having a driving gear 158 on the motor shaft, which driving gear 158 is in meshing engagement with a driven gear 159 nonrotatably secured to the spinner 112. Energization of motor 157 thus causes rotation of the spinner 112 within the cylindrical chamber 117.

The spinner 112 is further connected to a second drive means 161 for effecting reciprocation or linear movement of the spinner 112 axially of the cylindrical chamber 117. The second drive means 161 includes a conventional fluid pressure cylinder 162, preferably a hydraulic cylinder, from which extends a reciprocable piston rod 163. Piston rod 163 is axially connected to the extending end of the spinner 112 by means of a conventional rotary slip coupling 164. The drive means 156 and 161 have been described merely for illustrative purposes since it will be obvious that many different drive devices could be used to produce the necessary spinner movement.

The operation of the device illustrated in FIGS. 10—12 will be briefly described for a better understanding thereof.

First, it will be assumed that feed ram 169 is in its retracted position and spinner 112 is in its axially advanced position as illustrated by the solid lines in FIG. 10, the spinner being held in its axially advanced position by means of the fluid pressure cylinder 162, which cylinder is preferably interconnected to a conventional pressurized fluid accumulation chamber. Also, valve 122 will be in a closed position.

A quantity of particulate plastic material is supplied through the inlet 129 into the cylindrical opening 127. The fluid pressure cylinder 167 is then energized to move the ram 169 forwardly (downwardly in FIG. 10) to force the particulate plastic material into the annular passage 136 surrounding the intermediate shaft portion 133. The feed ram 169 forces the particulate material forwardly through the passage 136 into contact with the tapered surface 152. The drive motor 157 may be energized either when or before the ram 169 is moved, the drive motor 157 rotating the spinner 112 at a selected speed which may be constant or variable as desired. As the feed ram 169 moves forwardly within the opening 127, some of the particulate material is pressed against the tapered surface 152 of the spinner and is moved axially therepast, the relative rotation of the housing and spinner causing initial frictional working of the material.

As further material is forced by the feed ram 169 toward the tapered portion 151, some of the material surrounding the tapered portion 151 flows therepast into the annular passageway 144 which surrounds the working portion 139. As the material flows through the passageway 144, the particles are further frictionally heated and plasticized with the cooperating annular grooves 141 and ridges 142 causing the material to be completely mixed whereby the material thus assumes a homogeneous nature. The plastification of the material by the spinner 112 is thus substantially the same as the plasticizing operation explained above relative to the embodiments illustrated in the FIGS. 1—9. The plasticized material within the annular passageway 144 then flows through the passages 149 provided adjacent the cylindrical support portion 147 into the storage space 153.

As the quantity of plasticized material within the storage chamber 153 increases, the spinner 112 is forced axially rearwardly (rightwardly in FIG. 10) in opposition to the force imposed thereon by the fluid pressure cylinder 162, thereby permitting the storage chamber 153 to enlarge in proportion to the quantity of material being forced therein by the feed ram 169. The rearward retracting movement of the spinner 112 is permitted due to the fluid pressure cylinder 162 being interconnected to a conventional fluid accumulation chamber.

When the feed ram 169 reaches its forwardmost position (as illustrated by the dotted lines in FIG. 10), it is then locked in position to close off the cylindrical inlet opening 128. The valve member 122 is then rotatably moved to the open position to permit flow through the passage 121. Fluid pressure cylinder 162 is then energized to axially advance the spinner (leftwardly in FIG. 10). The forward axial movement of the spinner 112 actuates the antiflow-back means provided at the nose portion 151 and thereby causes the material within the storage chamber 153 to be forced through the passage 121 to a suitable plastic utilizing device, such as an injection-type mold, an accumulation chamber (as in U.S. Pat. No. 3,192,299) or an extrusion device. The nose portion 151, by having a configuration similar to that of the recess 119, causes substantially all of the plasticized material within the chamber 153 to be ejected from the machine.

After the plasticized material has been ejected from the chamber 153, the spinner 112 will again be in its forwardmost axial position substantially as illustrated by the solid lines in FIG. 10. The valve 122 will then be moved to the closed position and the feed ram 169 will be retracted upwardly to its open position to permit a further quantity of particulate plastic material to be deposited into the cylindrical opening 127. The plasticizing apparatus 110 is thus in condition to repeat the cycle.

The plasticizing operation as explained above may, if desired, be further assisted by providing the apparatus 110 with heating devices 172 mounted on the housing 111 substantially adjacent and in surrounding relationship to the working portion 139. The plasticizing apparatus 110 is also preferably provided with cooling passages 171 therein adjacent the inlet opening 128 so as to prevent the material adjacent the inlet from becoming sticky or tacky since any collection of material in the region of the inlet opening may cause contamination of the apparatus.

While the foregoing-described apparatus has assumed that the plastic material will be driven from the plasticizing device directly into a mold, and the drawing of FIG. 10 has been chosen accordingly, it will be recognized that the now fully plasticized material being discharged from the storage space 153 may be conducted to any desired location for any desired manner of use. For example, the plastic from the storage space 153 may be received into an accumulation or injection chamber and from thence into a mold in a manner shown in my U.S. Pat. No. 3,192,299.

I claim:
1. A plasticizing apparatus, comprising:
  housing means having an elongated cylindrical chamber formed therein:
  a working member positioned within said chamber and mounted relative to said housing means for movement axially of said chamber:
  plasticizing means for causing plastification of particulate plastic material primarily due to the generation of frictional heat energy, said plasticizing means including a first portion fixedly secured to and comprising a part of said working member and a second portion on said housing means in surrounding relationship to said first portion and defining an annular passageway therebetween, said plasticizing means also including a plurality of axially spaced annular grooves formed on one of said first and second portions with said grooves defining annular ridges therebetween:
  first drive means for causing relative rotation between said first and second portions:
  second drive means for causing axial movement of said working member within said chamber: and
  feeding means for supplying particulate plastic material to said plasticizing means whereby said particulate plastic material is frictionally heated and plasticized as the material is forced through the annular passageway.

2. An apparatus according to claim 1, wherein said housing means includes inlet and outlet means communicating with said chamber substantially adjacent the opposite ends thereof, said working member including a ram portion fixedly connected to and axially spaced upstream of said first portion, said ram portion being snugly received within said chamber in axial sliding and rotational engagement therewith, said working member being interconnected to and rotatably driven by said first drive means.

3. An apparatus according to claim 2, wherein said plurality of axially spaced grooves and ridges are formed on the periphery of said first portion of said working member, the groove and ridges defining a substantially smooth and continuous undulating peripheral surface.

4. An apparatus according to claim 2, wherein the feed means includes a reciprocating ram member slideably received within said inlet means for delivering particulate plastic material to said plasticizing means at a rate which is independent of the relative rotation between said first and second portions.

5. An apparatus according to claim 2, wherein said working member includes an intermediate shaft portion fixedly connected between said first portion and said ram portion, said intermediate shaft portion being of smaller cross-sectional area than said chamber to define an axially extending passage therebetween, said inlet means being adapted to communicate with said axially extending passage.

6. An apparatus according to claim 5, wherein said working member further includes a tapered portion fixedly connected between said intermediate shaft portion and said first portion, said tapered portion having a tapered surface which diverges in the direction of material flow.

7. An apparatus according to claim 6, wherein said plurality of axially spaced grooves and ridges are formed on the periphery of said first portion.

8. An apparatus according to claim 1, wherein said housing means includes inlet and outlet means communicating with said chamber substantially adjacent the opposite ends thereof, said working member including a ram portion positioned at one end of said working member substantially adjacent said inlet means with said ram portion being axially interconnected to said second drive means, said outlet means including a flow passage formed in said housing means with said flow passage communicating with said chamber substantially adjacent the other end of said working member, valve means cooperating with said flow passage for controlling flow therethrough, said valve means including a valve member movable between an open and a closed position, the other end of said working member cooperating with the adjacent end of said chamber to define a storage space therebetween with said flow passage communicating with said storage space, whereby material plasticized by said plasticizing means accumulates within said storage space when said valve member is in the closed position, so as to cause said working member to axially retract in opposition to said second drive means, opening of the valve member and energization of the second drive means causing said working member to move axially forwardly to force said plasticized material from said space into said flow passage.

9. An apparatus according to claim 1, wherein said ridges are formed on one of said first and second portions and extend toward the confronting periphery of the other of said first and second portions and define a plurality of narrow, axially spaced annular gaps therebetween, said plurality of axially spaced annular gaps progressively decreasing in radial dimension in the direction of material flow.

10. An apparatus according to claim 1, wherein said housing means includes inlet and outlet means communicating with said chamber substantially adjacent the opposite ends thereof, said outlet means including a flow passage formed in said housing means with said flow passage communicating with said chamber downstream of said first portion of said working member, valve means coacting with said flow passage for controlling flow therethrough, said valve means including a valve member movable between an open and a closed position and said working member being interconnected to and rotatably driven by said first drive means, whereby material processed by said plasticizing means accumulates within a storage space defined between said working member and said housing means when said valve member is in said closed position, thereby causing axial retraction of the working member within the chamber, whereupon opening of said valve member and energization of said second drive means causes said working member to move axially forwardly within the chamber to force said plasticized material from said flow passage.

11. In combination, a plasticizing apparatus including a housing having an elongated opening formed therein, a plasticizing rotor rotatably disposed within said opening and cooperating with said housing for plasticizing particulate plastic material primarily due to the generation of frictional heat energy, and feed means for supplying particulate plastic material to the rotor for permitting frictional heating and plastification of said material, comprising the improvement wherein:
  said plasticizing rotor includes a substantially cylindrical rotor portion and said housing includes a housing portion disposed in surrounding relationship to said rotor portion to define therebetween a first axially elongated, annular zone in which particulate plastic material is frictionally heated;
  one of said rotor portion and said housing portion including a plurality of separate, axially spaced annular ridges defining a plurality of axially spaced annular grooves therebetween, the grooves and ridges defining a substantially smooth and continuous undulating peripheral surface for permitting the plastic material to be frictionally heated, mixed, and plasticized;
  said rotor being disposed within said housing for movement axially of said opening and the downstream end of said rotor cooperating with the adjacent end of said housing to define a storage space therebetween in communication with said annular zone whereby material plasticized within said annular zone accumulates within said storage space;
  said housing including an outlet passage disposed in communication with said storage space for permitting discharge of plasticized material; and drive means connected to said rotor (1) for causing rotation of said rotor relative to said housing means to cause plastification of the particulate material as it passes through said annular zone and (2) for causing linear movement of said rotor axially of said opening to cause the plasticized material in such storage space to be discharged through said outlet passage.

12. The combination according to claim 11, wherein said drive means includes a first drive device connected to said rotor for causing rotation thereof and a second drive device connected to said rotor for causing linear movement thereof.

13. The combination according to claim 11, wherein said plasticizing rotor includes a ram portion fixedly interconnected to said rotor portion, said ram portion being axially aligned with and positioned upstream of said rotor portion and being rotatably and slidably disposed within said opening, and said feed means including an inlet passage disposed in communication with said opening at a location intermediate said rotor portion and said ram portion for permitting particulate plastic material to be supplied to said opening.

14. The combination according to claim 13, wherein said feed means includes a feed ram slidably disposed within said inlet passage and a driving device connected to said feed ram for reciprocating same for permitting particulate plastic material to be supplied to said opening and forced through said annular zone at a rate which is independent of the rotation of said rotor.

15. The combination according to claim 11, further including valve means associated with said outlet passage for controlling the flow therethrough, said valve means being movable between open closed positions.

16. The combination according to claim 11, wherein said plurality of annular grooves and ridges are formed on the external periphery of said rotor portion, the downstream end of said rotor portion being provided with a tapered configuration which converges in the direction of material flow and which is spaced from a similar tapered seat formed on the housing to define said storage space therebetween, and the upstream end of said rotor portion also being provided with a tapered configuration which diverges in the direction of material flow.

17. The combination according to claim 11, wherein a ram is axially fixedly connected to said rotor portion, said ram being axially aligned with and positioned upstream of said rotor portion and being axially slideably disposed within said opening and drivingly connected to said drive means.

UNITED STATES PATENT OFFICE
CERTIFICATE OF CORRECTION

Patent No. 3,593,379　　　　　　　　　　Dated July 20, 1971

Inventor(s) James W. Hendry

It is certified that error appears in the above-identified patent and that said Letters Patent are hereby corrected as shown below:

Column 2, line 50, change "o6" to -- of --.
Column 3, line  1, change "DETAILED" to -- housing --.
Column 5, line 64, change "81" to -- 82 --.
Column 7, line 48, after "inches," insert -- and the last annular ridge having a maximum diameter of 5.525 inches, --.

Signed and sealed this 19th day of September 1972.

(SEAL)
Attest:

EDWARD M. FLETCHER, JR.　　　　　　　　ROBERT GOTTSCHALK
Attesting Officer　　　　　　　　　　　　Commissioner of Patents